United States Patent [19]

Walker et al.

[11] Patent Number: 4,464,269

[45] Date of Patent: * Aug. 7, 1984

[54] ADDITIVE COMPOSITION FOR RELEASE OF STUCK DRILL PIPE

[75] Inventors: Thad O. Walker, Humble; Patricia C. Matthews, Houston, both of Tex.

[73] Assignee: Exxon Research & Engineering Co., Florham Park, N.J.

[*] Notice: The portion of the term of this patent subsequent to Mar. 13, 2001 has been disclaimed.

[21] Appl. No.: 369,577

[22] Filed: Apr. 19, 1982

Related U.S. Application Data

[63] Continuation-in-part of Ser. No. 288,110, Jul. 29, 1981, Pat. No. 4,436,638, which is a continuation-in-part of Ser. No. 254,424, Apr. 15, 1981, abandoned.

[51] Int. Cl.³ .................... E21B 31/00; C09K 7/06
[52] U.S. Cl. .................. 252/8.55 R; 166/301; 252/8.5 M; 252/8.5 P
[58] Field of Search ............ 252/8.5 C, 8.5 P, 8.5 M, 252/8.55 R, 8.55 B; 166/301; 568/622

[56] References Cited

U.S. PATENT DOCUMENTS

| | | | |
|---|---|---|---|
| 2,448,664 | 9/1948 | Fife et al. | 568/622 |
| 2,689,219 | 9/1954 | Menaul | 252/8.5 |
| 2,797,196 | 6/1957 | Dunn et al. | 252/8.5 |
| 3,047,494 | 7/1962 | Browning | 252/8.5 |
| 3,126,970 | 3/1964 | Rygg | 175/75 X |
| 3,217,802 | 11/1965 | Reddie et al. | 252/8.55 |
| 3,223,622 | 12/1965 | Lummus et al. | 252/8.5 |
| 3,275,551 | 9/1966 | Annis | 252/8.5 |
| 4,083,974 | 4/1978 | Turi | 424/241 |
| 4,230,587 | 10/1980 | Walker | 252/8.55 R |

OTHER PUBLICATIONS

Helmick et al., "Pressure-Differential Sticking of Drill Pipe", Article in *The Oil and Gas Journal*, vol. 55, Jun. 17, 1957, pp. 132–136.

*Primary Examiner*—Herbert B. Guynn
*Attorney, Agent, or Firm*—R. A. Dexter

[57] ABSTRACT

An additive composition effective in the release of stuck pipe in a borehole during a drilling operation which composition contains propoxylated $C_{18}$–$C_{32}$ alkanols, an oil-soluble emulsifier-wetting agent and a liquid hydrocarbon diluent and for enhanced elevated temperature emulsion stability may include an imidazoline.

8 Claims, No Drawings

ADDITIVE COMPOSITION FOR RELEASE OF STUCK DRILL PIPE

This application is a continuation-in-part of application Ser. No. 288,110, filed July 29, 1981, now U.S. Pat. No. 4,436,638, which is a continuation-in-part of application Ser. No. 254,424, filed Apr. 15, 1981, now abandoned.

FIELD OF THE INVENTION

This invention relates to new compositions useful in drilling operations wherein the drill string is stuck in the hole and cannot be readily released. More particularly, it relates to differential drilling operation problems involving stuck drill pipe and a chemical approach to overcoming said problems.

BACKGROUND OF THE INVENTION

The drilling of oil and gas wells by the rotary technique involves the circulation of a drilling fluid through the drill string, out the bit nozzles and its return to the surface via the annulus. This fluid cools and lubricates the drill string, develops sufficient hydrostatic head to counterbalance formation pressures and removes the cuttings from the borehole. This fluid also helps reduce the frictional forces between the drill string and the borehole or casing.

During the drilling operation, the drill string may become stuck and cannot be raised, lowered or rotated. There are a number of mechanisms possible which may contribute to this problem. Namely these are (1) cuttings or slough build-up in the hole; (2) an undergage hole; (3) key-seating; and, (4) differential pressures.

Differential sticking may be defined as the sticking of the drill string against a permeable formation containing less pore fluid pressure than the hydrostatic pressure exerted by the drilling fluid column and usually occurs when the drill string remains motionless for a period of time. The mechanism by which this occurs involves the drill string coming into contact with the permeable zone, remaining quiescent for a period of time sufficient for mud cake to build-up on each side of the point of contact, thus sealing the pipe against the borehole. The annular pressure exerted by the drilling fluid then holds the pipe against the borehole or the permeable zone.

Freeing of differentially stuck pipe is essentially a matter of reducing this pressure differential which exists across the pipe. One method used simply involves a reduction in fluid pressure by replacing the annular fluid with a less dense fluid allowing for less pressure differential to exist between the borehole and annulus. In some cases, the borehole pressure may exceed the annular pressure which in turn allows the pipe to be blown away from the borehole.

The most commonly used method to release stuck pipe is the spotting of an oil mud in the hole opposite the stuck interval. With time, the isolated area between the drill pipe and borehole is reduced by the oil mud. Too, oil invasion into the mud cake reduces the adhesive forces and lubricates the area between the pipe and borehole resulting in less friction and quicker release. More often than not, an extensive period of time is necessary for this to occur which results in an expensive loss of rig time.

In recent years, there has been a number of proprietary formulations developed aimed at releasing differentially stuck pipe, which formulations include: petroleum oil containing a material selected from the group consisting of 2-heptadecenyl-4-4-di-methoxy-2-oxazoline, 2-heptadecenyl-4-methoxy-4-methyl-2-oxazoline, the sodium salt of dioctyl sulfosuccinate, a mixture of a product containing high molecular weight free fatty acids, esters and alcohols made by acid cracking wool grease with about one-fourth its weight of the sodium salt of sulfated oleyl alcohol and mixtures thereof, in quantity suffficient to reduce interfacial tension at an interface between the petroleum oil and water to not more than 2 dynes per centimeter (U.S. Pat. No. 3,217,802); a surface-active agent prepared from about four parts of half ammonium half isopropylamine salt of the sulfosuccinic acid ester of the oleic acid amide of isopropanol amine and about one part of the isopropylamine salt of dodecyl benzene sulfonic acid which agent is added to the water base drilling fluid (U.S. Pat. No. 3,233,622); and, a polyethylene glycol having a molecular weight ranging from 106 to about 600 or a saturated salt water solution or a sea water solution of said glycol (U.S. Pat. No. 4,230,587).

There remains a serious need for chemical compositions which can better release stuck drill pipes, particularly those which have improved efficacy for releasing differentially stuck pipe.

SUMMARY OF THE INVENTION

It has been discovered that a mixture of $C_{18}$ to $C_{32}$ linear and branched alkanols propoxylated to contain from 20 to 25 mols of propylene oxide per mole of alkanol is a superior mud dehydrating agent which can be readily formulated with an emulsifier-wetting agent, e.g. a polyol ester of a $C_8$–$C_{22}$ fatty acid, and a hydrocarbon diluent to provide a superior additive for freeing the stuck pipe by injecting a water-in-oil emulsion containing said formulation in the drilling fluid.

Therefore, in accordance with this invention, there is provided a stuck pipe additive composition comprising: propoxylated $C_{18}$–$C_{32}$ alcohols represented by the formula:

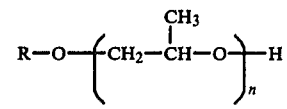

wherein R represents an alkyl group of from 18 to 32 carbon atoms and n is an integer of from 18 to 35; an oil-soluble emulsifier-wetting agent; and a hydrocarbon diluent. For improved high temperature stability complex imidazoline emulsifier is added to said composition.

The invention provides an improved method of releasing a stuck drill string in the borehole of an underground formation during drilling operations employing a drilling fluid which comprises contacting said stuck drill string with an additive composition effective to reduce the annular pressure exerted by the drilling fluid against the stuck drill string and to release said stuck drill string, said additive composition being comprised of propoxylated $C_{18}$–$C_{32}$ alcohols represented by the formula:

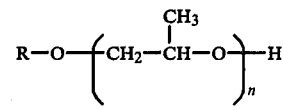

wherein R represents an alkyl group of from 18 to 32 carbon atoms preferably predominantly 20 to 24 carbon atoms and n is an integer of from 28 to 35; an oil-soluble $C_8-C_{22}$ fatty acid ester of polyol or polyol anhydride; and, a liquid hydrocarbon diluent. Again, for high temperature stability an effective amount of imidazoline emulsifier is also present whereby above about 94° C. there is a reduction in tendency to water-wet the solids, e.g. barite.

DETAILED DESCRIPTION OF THE INVENTION

The oil-soluble, propoxylated $C_{18}-C_{32}$ alkanols, constituting the mud dehydrating agent of the invention which has been found to possess a unique and surprising ability for mud dehydration under high pressure environments, represent a small chemical group within the general field of alkoxylation of long chain alcohols such as stearol (see U.S. Pat. No. 4,083,974).

For purposes of the present invention, the propoxylated mixture of $C_{18}-C_{32}$ alkanols is usefully predominantly alkanols of 20, 22 and 24 carbons. Such a mixture is sold commercially as Epal 20+ heavy alcohols and paraffins by the Ethyl Corporation of Baton Rouge, LA. Epal 20+ has the following typical compositions:

| Component | Weight Percent |
|---|---|
| $C_{18}OH$ | 4 |
| $C_{20}OH$ | 20 |
| $C_{22}OH$ | 13 |
| $C_{24}OH$ | 10 |
| $C_{26}OH$ | 8 |
| $C_{28}OH$ | 5 |
| $C_{30}OH$ | 3 |
| $C_{32}OH$ and higher | 3 |
| Total normal and branched alcohols | 66 |
| Normal alcohols | 33 |
| Branched alcohols | 33 |
| Hydrocarbons ($C_{24}$ to $C_{40}$) | 34 |
| Total | 100 |

As previously noted these oil-soluble propoxylated alkanols can be represented by the formula:

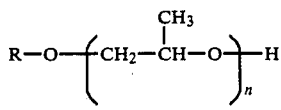

wherein R is an alkyl group containing 18 to 32, preferably predominantly 20 to 24, carbon atoms and n is an integer ranging from 18 to 35, preferably 20 to 25.

Propoxylation is by conventional techniques involving the catalytically induced alkoxylation reaction, e.g. with NaOH, of propylene oxide and the mixture of $C_{18}-C_{32}$ alkanols. The reaction is exothermic with the temperature usefully held at from 105°-150° C., e.g. at about 140° C.

Suitable polyols for preparing the oil-soluble emulsifier-wetting agents of the present invention are those polyhydric alcohols such as glycerol, diglycerol, and the sugar alcohols, which may be represented by the formula $CH_2OH(CHOH)_mCH_2OH$ where m is one to five as well as the polyol anhydrides thereof. Preferred are the esters of glycerol itself, $C_3H_5(OH)_3$, sorbitol and sorbitol anhydride (sorbitan). Esters based upon relatively higher, i.e., $C_{12}-C_{22}$, fatty acids or mixtures of fatty acids are more preferable, such as the tall oil fatty acids. The fatty acids may be saturated or unsaturated. Especially preferred are glycerol and sorbitan partial esters of liquid $C_{18}-C_{22}$ unsaturated fatty acids such as oleic, linoleic and palmitoleic fatty acids and mixtures of such acids. Optimally, the emulsifier-wetting agent is the sorbitan partial ester of oleic acid which ester is commercially available as Span 80 solid by ICI-Americas of Wilmington, Del.

The hydrocarbon diluent is present in the stuck pipe formulation to facilitate and/or make possible a water-in-oil emulsion by means of which the aforesaid formulation is introduced into the drilling fluid and thereby carried to the mud pack contiguous to the contact point. Preferred hydrocarbon diluents are mineral seal oil, diesel oil, paraffinic oil and white mineral oil.

The quantities of propoxylated alkanols mud dehydrating agent, emulsifier-wetting agent and diluent which are used in the stuck pipe formulation are best expressed relative to the total amount of the formulation. Generally the stuck pipe additive compositions contain: from 5 to 18, preferably 8 to 12, weight percent propoxylated alkanols mud dehydrating agent; from 8 to 20, preferably 10 to 18, weight percent emulsifier-wetting agent; and, the balance hydrocarbon diluent.

The incorporation of a small but an effective amount of a supplementary emulsifier, usually a complex oil soluble imidazoline, improves the high temperature (above about 94° C.) emulsion stability and/or reduces the tendency to water-wet contained solids of the stuck drill pipe formulation of the invention. Oil soluble imidazolines such as the reaction product of a $C_{10}-C_{30}$ aliphatic or cycloaliphatic carboxylic acid, e.g. tall oil and an alkylene polyamine diethylene triamine as is generally taught in U.S. Pat. No. 3,416,900 are useful as supplemental emulsifiers when used in an amount ranging from 0.05 to 0.5, preferably 0.1 to 0.2, weight parts per part by weight of propoxylated $C_{18}-C_{32}$ alkanols.

Thus the imidazoline can be characterized as a heterocyclic compound including the structural moiety of

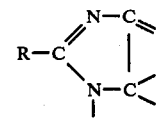

wherein R is an alkyl or cycloalkyl group having from 10 to 30 carbons.

Particularly preferred is a stuck pipe formulation of 11 weight percent propoxylated $C_{18}-C_{32}$ alkanols mud dehydrating agent, 13 weight percent sorbitan partial ester of oleic acid and the balance, a paraffinic oil diluent.

The composition is readily prepared by simply admixing all these components as by stirring at ambient temperatures.

A water-in-oil emulsion is prepared using the preferred stuck pipe formulation of the invention and fresh water. The desired quantity of stuck pipe formulation is placed in a container. To this is slowly added with vigorous stirring the desired amount of water. After addition of the water, the liquid is stirred for an additional 0.5 hours. This procedure produces a milky viscous water-in-oil emulsion which can contain from 10 to 55 volume percent of fresh water.

The emulsion so prepared is used as the spotting fluid. A given quantity, usually 50 to 100 bbl. of the spotting fluid is pumped from a slugging pit down the drill pipe through the bit, into the annulus and is spotted adjacent to the point considered to be differentially stuck. The spotting fluid is allowed to soak for a give time, e.g. from 8 to 12 hours. During this soaking process 2 to 3 bbl. of fluid may be pumped from the drill pipe each hour to assure maximum benefit from the spotting fluid by introducing fresh spotting fluid to the region contiguous with the contact point.

Under some circumstances, it is desirable to admix from 40 to 70, preferably 57, weight percent of the propoxylated $C_{18}$–$C_{32}$ alcohols represented by the formula:

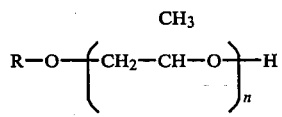

wherein R represents an alkoxy group of from 18 to 32 carbon atoms and n is an integer of from 18 to 35 with from 60 to 30, preferably 43, weight percent of said emulsifier-wetting agent into a package which can subsequently be blended with said liquid hydrocarbon diluent at a remote location, e.g., at a facility adjacent to the location at which said additive composition is to be utilized.

The invention will be further understood by reference to the following Examples which illustrate a preferred form of the invention and compare the same with commercially available stuck pipe formulations.

EXAMPLE 1

Preparation of the $C_{18}$–$C_{32}$, predominantly $C_{20}$–$C_{24}$ alcohol propoxylate.

The raw material used for preparation of the propoxylate is the earlier described $C_{20+}$ distributed by the Ethyl Corporation. This alcohol is a mixture of linear and branched $C_{20+}$ alcohols and $C_{24}$ to $C_{40}$ hydrocarbons. The alcohols contained in this mixture are as follows: $C_{18}$—4%; $C_{20}$—20%; $C_{22}$—13%; $C_{24}$—10%; $C_{26}$—8%; $C_{28}$—5%; $C_{30}$—3%; $C_{32}$ and higher —3%; which makes a total of 66% branched and linear alcohols. The remaining 34% is mixed hydrocarbons of 24 to 40 carbons. This alcohol is a waxy solid having a congealing point of approximately 46° C. This alcohol is propoxylated in a five gallon pilot plant batch reactor specifically designed to do alkoxylations. The procedure used to propoxylate this material is as follows:

One mole of the $C_{20+}$ alcohol is first melted so that it can be added through a small port-hole into the reactor. This is followed by the addition of 40 grams of catalyst, in this case sodium hydroxide; however, potassium hydroxide may also be used. The reactor is sealed, stirring initiated, and then the reactor is purged with nitrogen several times to remove all the air. The contents of the reactor are heated to 130° C. Addition of propylene oxide (23 moles) is initiated at a slow rate. Since the reaction is exothermic, the propylene oxide feed rate is adjusted so that the temperature is not allowed to go above 160° C. nor is the pressure allowed to exceed 40 psi. Upon completing the addition of the propylene oxide (23 moles), the reaction mixture is samples and analyzed by nuclear magnetic resonance (NMR) to determine the average number of moles of propylene oxide added per mole of alcohol. In this case, the average number of moles of propylene oxide added was 23.

EXAMPLE 2

The $C_{20+}$ alcohols propoxylate of Example 1 is used as the primary ingredient for the preparation of a stuck pipe additive formulation. It is known that to have a good stuck pipe additive, one must have a system that is very oily. Therefore, in addition to the $C_{20+}$ propoxylated alcohols, sorbitan monooleate ester was added as the emulsifier-wetting agent. This material is known to be a very good molecule for rendering a surface oil wet.

Formulations containing varying quantities of the $C_{20+}$ propoxylate, sorbitan monooleate, and diluent hydrocarbon were prepared. These were evaluated as to the ability of each to form a stable viscous oil external emulsion with from 10 to 50% by volume of fresh water. This evaluation indicated that a formulation consisting of 11% by weight of said $C_{20+}$ alcohols propoxylate, 13% by weight of sorbitan monooleate and the balance paraffinic oil provided the best system in terms of rheology (viscosity) and gel strength.

EXAMPLE 3

The $C_{20+}$ alcohols propoxylate, sorbitan monooleate and paraffinic oil formulation was evaluated against several commercial stuck pipe additives. These additives were evaluated with a 12.4 pound per gallon sea water lignosulfonate mud having the following composition: 20 pounds per barrel of Wyoming bentonite, 60 pounds per barrel of Martin No. 5 Ball Clay, 7 pounds per barrel of ferrochrome lignosulfonate, 14.1 pounds per barrel of commercial sea water mixture, 2 pounds per barrel of sodium hydroxide, and sufficient barite to give the desired weight. Using this mud, a sticking test procedure which best approximates downhole stuck pipe conditions was used to evaluate these stuck pipe additives.

In this test procedure, a filter cake of lignosulfonate mud is allowed to form under controlled conditions. A small disc is placed on top of the filter cake and additional filter cake is deposited on and around the disc until it becomes stuck. The force required to "unstick" or remove the disc is determined to provide the control value. The procedure is repeated until the disc becomes stuck after which a stuck pipe formulation to be tested is poured on top of the filter cake and allowed to soak for a given time. The force required to remove the disc is then determined. The force (in kg) required to remove the disc from a cake "unsoaked" minus the force (in kg) necessary to remove the disc from a soaked cake divided by the force required to remove the disc from an unsoaked cake is reported as the % reduction. These tests are performed in quadruplicate and the results averaged out to a single reported value.

The following data of Table I indicates the comparative performance of several stuck pipe formulations.

TABLE I

| Added Stuck Pipe Formulation | Sticking Force, kg | | % Reduction in Sticking Force | |
|---|---|---|---|---|
| | Comparison | | | |
| | I | II | I | II |
| None | 3.1 | 3.7 | — | — |
| Commercial Additive A | 3.3 | — | −6.5 | — |
| Commercial Additive B | 2.9 | 3.5 | +6.5 | +5.4 |

TABLE I-continued

| Added Stuck Pipe Formulation | Sticking Force, kg | | % Reduction in Sticking Force | |
|---|---|---|---|---|
| | Comparison | | | |
| | I | II | I | II |
| Commercial Additive C | — | 3.1 | — | +16.2 |
| Additive of Example 2 | 2.6 | — | +16.1 | — |
| Water-in-Oil emulsion (50% water, 50% Additive of Ex. 2) | — | 2.25 | — | +39.2 |

The test was carried out in a 3 inch diameter coarse fitted glass filler funnel attached to a vacuum line which pulls about 15 inch of mercury. The round metal disc is 0.5 inch in diameter and of 1 inch thickness. The disc is attached to a spring gauge for measuring the sticking force.

The data of Table I shows the remarkable improved superiority of the stuck pipe formulations according to this invention.

EXAMPLE 4 57 weight parts of the $C_{18}$–$C_{32}$ alcohol propoxylate of Example 1 is admixed with 43 weight parts of sorbitan monooleate in sufficient amounts to fill a 55 gallon drum. The drum is sealed and shipped to a remote location where the contents of said drum is blended adjacent to the drilling site with 110 gallons (2 drums) of mineral seal oil making it readily available for on site preparation of the spotting fluid.

EXAMPLE 5

Four spotting fluid emulsions were prepared for testing of emulsion stability at 94° C. Each was prepared by emulsifying 3 parts by weight (278.5 g) of an additive concentrate containing the $C_{18}$–$C_{32}$ alkanols propoxylated with 23 moles of propylene oxide and paraffinic mineral oil with 2 parts by weight (179 g) of fresh water to which emulsion was slowly added with stirring 4 parts by weight (240 g) of barite.

The results after exposure at 94° C. for 16 hours are shown in Table II.

TABLE II

| Emulsion | Composition Additive Concentrate wt % | % "Free Oil" |
|---|---|---|
| 5A | Propoxylated alcohols - 17; Sorbitan monooleate - 13; and paraffinic oil - 70. | 25 |
| 5B | Propoxylated alcohols - 15.8; Sorbitan monooleate - 11.8; Imidazoline** 2.4; and paraffinic oil 70%. | 0 |
| 5C | Propoxylated alcohols - 17; Ethoxylated sorbitan-monooleate - 13%; and paraffinic oil 70%. | 25 |
| 5D | Propoxylated alcohols - 17; sorbitan trioleate - 13; and paraffinic oil 70%. | 50 |

*volume % of non-emulsified blend-out of oil in 350 mls.
**purchased as Imidazoline MA 850 from Aquaness Chemicals of Houston, Texas.

The foregoing data shows that the imidazoline supplemental emulsifier improves emulsion stability under elevated static heat conditions and by visual observation apparently provides reduced water wetting tendency of contained solids.

The invention in its broader aspect is not limited to the specific details shown and described and departures may be made from such details without departing from the principles of the invention and without sacrificing its chief advantages.

What is claimed is:

1. An improved method for releasing a differentially stuck drill string in the borehole of an underground formation during drilling operations employing a drilling fluid which comprises contacting said stuck drill string with an additive composition effective to reduce the annular pressure exerted by the drilling fluid against the stuck drill string, said additive composition being comprised of: from 5 to 18 weight percent of a mud dehydrating agent represented by the formula

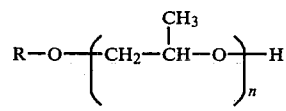

wherein R represents an alkyl group of from 18 to 32 carbon atoms and n is an integer of from 35; from 8 to 20 weight percent of an oil-soluble $C_8$–$C_{22}$ fatty acid ester of a polyol or polyol anhydride emulsifier-wetting agent; from 0.05 to 0.5 weight parts of an oil soluble imidazoline supplemental emulsifier per weight part of said dehydrating agent; and, the balance a liquid hydrocarbon diluent.

2. The method according to claim 1 wherein said propoxylated alcohols contain predominantly 20 to 24 carbon alkoxy groups and n ranges from 20 to 25 and said fatty acid ester is sorbitan mono-oleate.

3. The method according to claim 2 wherein said hydrocarbon diluent is a member of the class consisting of mineral seal oil, diesel oil, paraffinic oil and white mineral oil.

4. The method according to claim 1 wherein said composition is a water-in-oil emulsion with said water being from about 10 to 50 percent by weight of said emulsion.

5. A stuck pipe additive composition comprising from 8 to 20 weight percent of propoxylated $C_{18}$–$C_{32}$ alcohols represented by the formula:

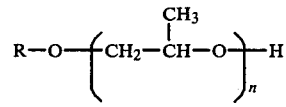

wherein R represents an alkyl group of from 18 to 32 carbon atoms and n is an integer of from 18 to 35; from 8 to 20 weight percent of an oil-soluble $C_8$–$C_{22}$ fatty acid ester or a polyol or polyol anhydride emulsifier-wetting agent; from 0.05 to 0.5 weight parts of an oil soluble imidazoline supplemental emulsifier per weight part of said propoxylated alcohols, and the balance a hydrocarbon diluent, said weight being based on the total weight of said composition.

6. A stuck pipe additive concentrate consisting of from 40 to 70 weight percent propoxylated $C_{18}$–$C_{32}$ alcohols represented by the formula:

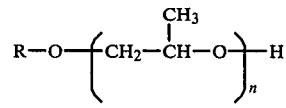

wherein R represents an alkyl group of from 18 to 32 carbon atoms and n is an integer of from 18 to 32, from 0.05 to 0.5 weight parts of an oil soluble imidazoline supplemental emulsifier per weight of said propoxylated alcohols and the balance an oil-soluble $C_8$–$C_{22}$ fatty acid ester of a polyol or polyol anhydride emulsifier-wetting agent, said weight percent being based on the total weight of said concentrate.

7. A stuck pipe additive concentrate according to claim 6 wherein said propoxylated alcohols predominantly contain from 20 to 24 carbons and said emulsifier-wetting agent is sorbitan monooleate.

8. A stuck pipe additive concentrate according to claim 7 wherein said propoxylated alcohols are present in about 57 weight percent.

* * * * *